United States Patent [19]

Bennett et al.

[11] Patent Number: 4,622,611

[45] Date of Patent: Nov. 11, 1986

[54] DOUBLE LAYER CAPACITORS

[75] Inventors: Phillip D. Bennett, Cleveland Heights; John C. Currie, Novelty, both of Ohio

[73] Assignee: The Standard Oil Company, Cleveland, Ohio

[21] Appl. No.: 719,100

[22] Filed: Apr. 2, 1985

[51] Int. Cl.⁴ .............................................. H01G 9/00
[52] U.S. Cl. .................................... 361/433; 252/62.2
[58] Field of Search ........................ 361/433; 252/62.2

[56] References Cited

U.S. PATENT DOCUMENTS

| | | | |
|---|---|---|---|
| 2,174,841 | 10/1939 | Robinson | 361/433 |
| 3,536,963 | 10/1970 | Bdos | 361/433 |
| 3,652,902 | 3/1972 | Hart et al. | 361/433 |
| 4,327,400 | 4/1982 | Muranaka et al. | 361/433 |
| 4,394,713 | 7/1983 | Yoshida | 361/433 |
| 4,438,481 | 3/1984 | Phillips et al. | 361/433 |

*Primary Examiner*—L. T. Hix
*Assistant Examiner*—Douglas S. Lee
*Attorney, Agent, or Firm*—Harold M. Snyder; David M. Ronyak; Gary R. Plotecher

[57] ABSTRACT

Double layer capacitors incorporate electrolytes having relatively high pH whereby reduced leakage current is attained as well as greatly extended back-up times.

8 Claims, 3 Drawing Figures

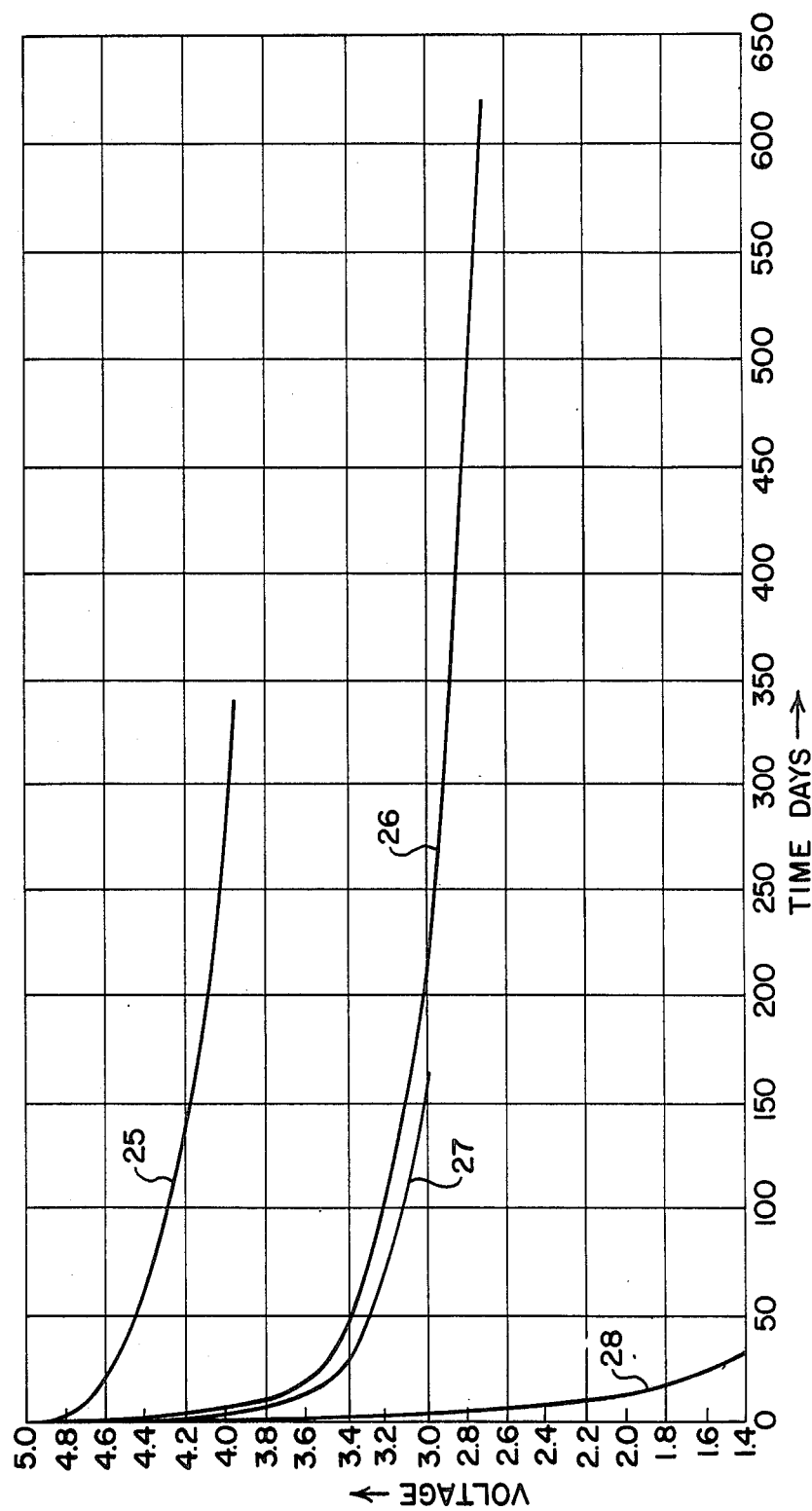

DOUBLE LAYER CAPACITORS

BACKGROUND OF THE INVENTION

1. Field of the Invention

This invention is concerned with double layer capacitors and, more particularly, with an especially suitable electrolyte for the capacitor.

2. Description of the Prior Art

Double layer capacitors are disclosed in prior U.S. patents including:
U.S. Pat. No. 3,536,963
U.S. Pat. No. 3,652,902
U.S. Pat. No. 4,327,400
U.S. Pat. No. 4,394,713

In general, the above patents describe double layer capacitors which comprise a pair of polarization electrodes having a separating medium therebetween. The electrodes are composed of a solid and liquid phase and the electric double layer which characterizes these capacitors is formed at the interface between the solid and liquid (electrolyte) phases of the electrodes. The separating medium acts as an electronic insulator between the electrodes, but is sufficiently porous to permit ion migration therethrough.

Double layer capacitors can be made in miniature size, yet they exhibit very large capacitance when compared with conventional capacitors of similar or near similar size.

In the following description, reference will be made to the "leakage current" of capacitors. "Leakage current" is defined as the internal mechanism by which the capacitor self-discharges. It is measured by determining the current required to maintain the capacitor at a given charging voltage.

The prior art double layer capacitors having highly acidic electrolytes are found to work well for applications which require a current discharge above about 1 $\mu$A. Where the particular application calls for a current discharge below this level, the internal leakage current of these prior art capacitors approaches, and may exceed, the required external current. So, for these low-current drain applications, the prior art capacitors will fail to deliver the required external current for useful periods of time.

An important consideration when judging the relative merits of capacitors is the time it takes for the voltage of charged capacitors to fall from some selected value to a selected lower value at a specified current discharge rate. The time consumed in discharging a capacitor to the extent specified is termed its "back up time". Back up times of capacitors are used as one facet of comparing performance.

A selected discharge current might be say, 1 $\mu$A, in an electric circuit set up to compare the back-up times of capacitors. The back up time of a prior art double layer capacitor comprising a stack of six unit cells initially charged to 5 volts and discharged at 1 $\mu$A is found to be less than 50 days; the final selected voltage being 2 volts.

Where charged capacitors are to be stored for varying periods prior to use, the leakage current becomes significant because this determines the "shelf life" of the unit. It would be especially valuable to have a capacitor which would reliably retain a useful voltage level for storage periods of several months or longer.

SUMMARY OF THE INVENTION

The present invention is directed to an improved double layer capacitor comprising an electrolyte composed of an aqueous solution having a pH above about 2. With such an electrolyte the capacitor exhibits a low leakage current. The aqueous solution of which the electrolyte is composed is based on one or more salts from the group sulfates, phosphates and chlorides. Such salts include $K_2SO_4$, $(NH_4)_2SO_4$, $Li_2SO_4.H_2O$, $Na_2SO_4$, $K_2HPO_4$, $(NH_4)_2HPO_4$, $Na_2HPO_4$ and $CaCl_2$. An aqueous solution having a pH greater than 3.5 comprising about 100 grams of $K_2SO_4$ and less than 1 gram of $KHSO_4$ per liter of solution has worked well as an electrolyte.

DESCRIPTION OF THE DRAWINGS

FIG. 3 is a graph in which the voltage of double layer capacitors is plotted against time under open circuit conditions with capacitors of the invention compared with a commercial capacitor.

DETAILED DESCRIPTION OF THE INVENTION

Figure 1:
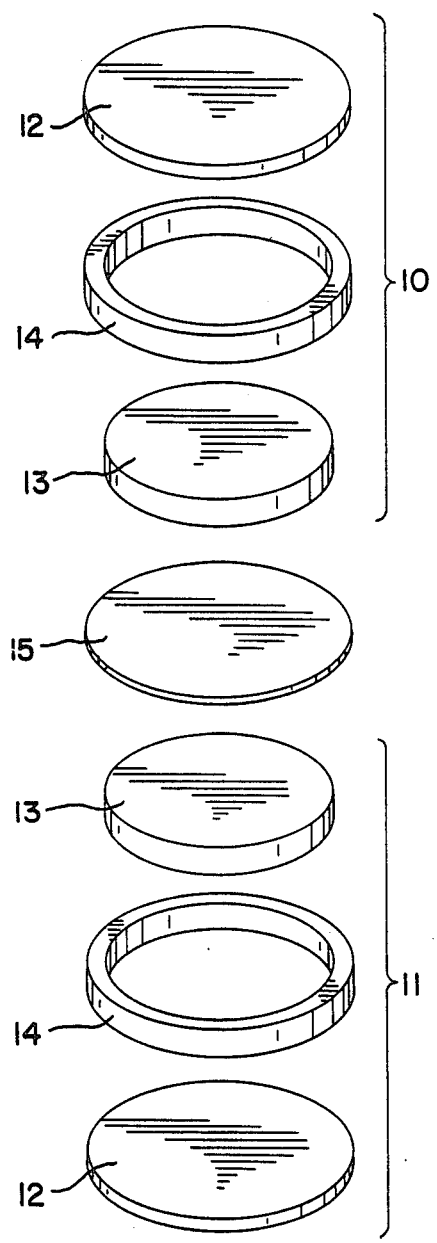
FIG. 1 is an exploded view of a single cell electrolytic double layer capacitor of the invention.
Figure 2:
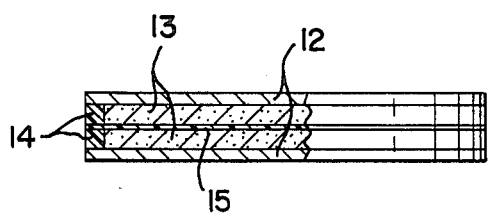
FIG. 2 is an elevational sectional view schematically showing an assembled single cell electrolytic double layer capacitor of the type shown in FIG. 1.

In FIGS. 1 and 2, the single cell double layer capacitor depicted consists of a pair of electrode assemblies 10, 11. Each electrode subassembly consists of an electric conducting and ionic insulating collector member 12 which can be made of, for example, carbon-loaded butyl rubber, lead, iron, nickel, tantalum or any impervious conducting material. Collector member 12 is characterized by its electrical conducting property and its chemical inertness to the particular electrolyte employed at the potential impressed upon it. Its primary functions are as a current collector and inter-cell ionic insulator. If the particular electrically conducting and ionic insulating collector member is susceptible to corrosion by the electrolyte or is not completely impervious, thus permitting the electrolyte to seep through and corrode adjoining components, the surfaces of the member can be provided with a coating of a noble metal or a substance such as colloidal graphite in a solvent such as alcohol to minimize such problems.

Annular means or gasket 14 is preferably cemented or in some manner affixed to collector member 12. Since electrode 13 is not a rigid mass but is to some extent flexible, the principal function of gasket 14 is to confine electrode 13 and prevent the mass of the electrode material from creeping out. Gasket material is preferably an insulator, although it need not necessarily be that. It should be flexible to accommodate expansion and contraction of the electrode. Other obvious ways of confining the electrode would be apparent to those skilled in the art.

Separator 15 is generally made of highly porous material which functions as an electronic insulator between the electrodes, yet affording free and unobstructed movement to the ions in the electrolyte. The pores of the separator 15 must be small enough to prevent carbon-to-carbon contact between the opposing electrodes, since such a condition would result in a short circuit and consequent rapid depletion of the charges accumulated on the electrodes. The separator can also be a nonporous ion-conducting material, such as the ion exchange membranes. Of the numerous ion exchange membranes, polyzirconium phosphate and the perfluorosulfonic acid membrane sold under the trademark NAFION by E. I. Dupont de Nemours & Co. are of particular interest. Any conventional battery separator should be suitable, and materials such as porous polyvinyl chloride, porous polypropylene, glass fiber filter paper, cellulose acetate, mixed esters of cellulose, and Fiberglas cloth have been tried and were found to be useful. Prior to its use the separator may be saturated with electrolyte. This can be accomplished by soaking the separator in the electrolyte for about 15 minutes or less. The saturation step is not required in all cases.

Carbon electrode 13 consists of high surface area carbon, say 100 to 2000 meters$^2$/g, and an electrolyte associated therewith. Activation of carbon is a process by means of which greatly improved adsorption properties and surface area are imparted to a naturally occurring carbonaceous material. Because electrical energy storage of a capacitor is apparently based on surface area, an increase in energy storage can be expected from an increase in surface area, as by activation.

An extensive discussion of activation of carbon is set forth in U.S. Pat. No. 3,536,963 and need not be repeated here.

Suitable electrodes may be made from carbon fiber or from activated carbon particles. Carbon fiber having a high surface area may be obtained by carbonizing fibers made from materials such as rayon fibers. The carbon fibers obtained are then impregnated with electrolyte to serve as the electrode. Activated carbon particles may be made into a carbon paste electrode as described in the above mentioned U.S. Pat. No. 3,536,963. In preparing such a carbon paste electrode, activated carbon, in the form of powder or fine particles, is mixed with an electrolyte to form a thick slurry. The use of coarse carbon particles should be avoided since projections of the coarse particles would tend to penetrate the separator and establish carbon-to-carbon contact between the opposing electrodes, thus causing a short. Water or other diluent can be used to facilitate preparation of the slurry. After the slurry is formed and the carbon and the electrolyte are well dispersed, excess water or diluent is extracted by conventional means, leaving a viscous paste. An electrode pellet is formed from the paste by placing a batch of the paste under a ram and applying a predetermined pressure. Upon application of pressure, some liquid will generally exude from the paste.

The electrolyte consists of a highly conductive aqueous solution of an inorganic salt having a pH greater than 2. The electrolyte is prepared by dissolving a known amount of the salt in distilled water to obtain a concentration close to saturation and then diluting the solution with additional distilled water to achieve the desired pH value.

Examples of double layer capacitors of the invention are assembled with the principal elements of each unit cell being (1) a pair of pressed activated carbon (APL Carbon) electrodes impregnated with electrolyte, (2) a current collector of carbon-loaded butyl rubber film (a material sold by the Industrial Electronic Rubber Company) fixed in electrical contact with each electrode, and (3) a porous film separator composed of a hydrophilic polypropylene sold under the name Celgard 3401 by Celanese Co. positioned between the electrodes. The unit cells are 1.6 inches in diameter (40.6 mm). The electrolyte is $K_2SO_4/KHSO_4$ prepared in various concentrations to show the effect of pH. One capacitor is made up using the 25% $H_2SO_4$ as the highly acidic electrolyte of the prior art for the purpose of comparison. In Table I electrolytes at five levels of pH are listed and the effect of each pH level on the properties of the capacitors is recorded.

From the above table, it can be seen that the leakage current characterizing the double layer capacitor with higher pH electrolyte is an order of magnitude less than that of the highly acidic electrolytes. As to capacitance it can be said that while the capacitance is somewhat lower than that of the prior art double layer capacitors, nevertheless, the capacitance remains at a highly useful level. Regarding the equivalent series resistance of the units, a slight increase in resistance is noted at the higher pH levels, but the slightly increased resistance of such units is regarded as tolerable in that it does not seriously affect the function of the capacitors.

As indicated, the above test results were obtained on single cell capacitors. In order to achieve higher voltage ratings a plurality of single cell units are stacked with the current collector elements of each unit cell in contact with the next adjacent units. The test results presented in Table II were obtained using capacitors each assembled by stacking six unit cells as described above. The stacked cells are "canned" in an inner, insulating liner and an outer metal container. Various electrolytes of the invention at pH levels from 4.2 to 9.9 are used in assembled double layer capacitors. The activated carbon used in the electrodes is either APL carbon or PWA carbon, both available from Calgon. Results obtained in essentially identical structures with the highly acidic electrolyte of the prior art are included for comparison purposes.

From these results it is seen that for this group of electrolytes the capacitor leakage currents are generally an order of magnitude less than that of the prior art capacitors having highly acid electrolytes.

In Table III, "back-up" times are set forth for most of the electrolytes listed in Table II at two different current discharge rates (1 $\mu$A and 0.1 $\mu$A). The capacitors had all been charged to 5 volts and the end point of the test was reached when voltage of the unit had dropped to 2 volts. It is seen that several of the tested electrolytes produce capacitor back-up times equal to or better than highly acidic electrolytes at the discharge current of 1 $\mu$A, while the back up times at 0.1 $\mu$A yielded by certain of the electrolytes are hundreds of hours longer than that obtained with prior art capacitors.

TABLE I

| pH | Electrolyte Conductivity $(\Omega cm)^{-1}$ | Leakage Current $\mu$A | Capacitance F | Equivalent Series Resistance $\Omega$ |
|---|---|---|---|---|
| 1.4 | 0.25 | 482 | 80.48 | 0.092 |
|  |  | 499 | 80.12 | 0.085 |
| 1.8 | 0.13 | 339 | 80.12 | 0.085 |
|  |  | 294 | 74.10 | 0.190 |
| 2.6 | 0.090 | 58 | 44.12 | 0.190 |
|  |  | 55 | 44.88 | 0.189 |
| 3.6 | 0.078 | 24 | 35.59 | 0.153 |
|  |  | 24 | 36.29 | 0.196 |
| 4.6 | 0.039 | 27 | 36.20 | 0.149 |
|  |  | 27 | 36.75 | 0.174 |
| 25% $H_2SO_4$ (<2) | 0.72 | 400–500 | 110–120 |  |

TABLE II

| Electrolyte | Leakage Current μA | Capacitance F | Equivalent Series Resistance Ω | Average Leakage Current μA | Average Capacitance F | Average Equivalent Series Resistance Ω |
|---|---|---|---|---|---|---|
| $Li_2SO_4.H_2O$ | 0.220 | 0.078 | 21.1 | 0.187 | 0.075 | 22.9 |
| APL Carbon | 0.170 | 0.072 | 18.8 | pH = 4.8 | $K = 5.2 \times 10^{-2}$ $(\Omega cm)^{-1}$ | 1.56 M |
|  | 0.170 | 0.076 | 28.7 |  |  |  |
| $Na_2SO_4.10H_2O$ | 1.074 | 0.114 | 25.3 | 0.501 | 0.094 | 22.4 |
| APL Carbon | 0.309 | 0.093 | 22.5 | pH = 7.6 | $K = 4.6 \times 10^{-2}$ $(\Omega cm)^{-1}$ | 0.54 M |
|  | 0.121 | 0.077 | 19.3 |  |  |  |
| $K_2SO_4$ | 0.230 | 0.076 | 15.8 | 0.197 | 0.075 | 15.8 |
| APL Carbon | 0.180 | 0.074 | 17.2 | pH = 6.4 | $K = 6.5 \times 10^{-2}$ $(\Omega cm)^{-1}$ | 0.57 M |
|  | 0.180 | 0.074 | 14.5 |  |  |  |
| $(NH_4)_2SO_4$ | 2.820 | 0.128 | 7.9 | 2.106 | 0.105 | 8.4 |
| APL Carbon | 0.064 | 0.090 | 8.5 | pH = 5.6 | $K = 1.5 \times 10^{-2}$ $(\Omega cm)^{-1}$ | 3.79 M |
|  | 1.393 | 0.096 | 8.7 |  |  |  |
| 25 wt % $H_2SO_4$ | 19.64 | 0.165 | 8.8 | 33.05 | 0.301 | 6.1 |
| APL Carbon | 29.37 | 0.355 | 4.2 | pH < 2 |  |  |
|  | 50.15 | 0.383 | 5.2 |  |  |  |
| $NaH_2PO_4.H_2O$ | 4.174 | 0.162 | 29.3 | 3.936 | 0.143 | 26.9 |
| APL Carbon | 4.313 | 0.110 | 23.6 | pH = 4.2 | $K = 4.1 \times 10^{-2}$ | 2.90 M |
|  | 3.320 | 0.156 | 27.9 |  |  |  |
| $K_2HPO_4$ | 0.001 | 0.139 | 17.5 | 0.291 | 0.107 | 18.8 |
| APL Carbon | 0.232 | 0.092 | 19.0 | pH = 9.9 | $K = 10.9 \times 10^{-2}$ | 2.31 M |
|  | 0.351 | 0.091 | 19.9 |  |  |  |
| $(NH_4)H_2PO_4$ | 1.780 | 0.112 | 16.6 | 2.074 | 0.116 | 20.6 |
| APL Carbon | 2.405 | 0.115 | 20.7 | pH = 4.4 | $K = 5.0 \times 10^{-2}$ | 1.74 M |
|  | 2.036 | 0.122 | 24.4 |  |  |  |
| $Na_2SO_4.10H_2O$ | 0.231 | 0.083 | 26.8 | 0.220 | 0.085 | 27.3 |
| NaBr | 0.210 | 0.087 | 22.2 | pH = 7.6 |  |  |
| APL Carbon |  |  | 32.8 |  |  |  |
| 25 wt % $H_2SO_4$/0.2MHBr | 12.02 | 0.180 | 8.0 | 13.69 | 0.172 | 7.1 |
| APL Carbon | 14.50 | 0.168 | 6.8 | pH < 2 |  |  |
|  | 14.56 | 0.169 | 6.6 |  |  |  |
| $K_2SO_4$ | 0.290 | 0.075 | 24.3 | 0.320 | 0.075 | 25.7 |
| PWA Carbon | 0.200 | 0.073 | 24.0 | pH = 6.4 |  |  |
|  | 0.471 | 0.076 | 28.7 |  |  |  |
| 25 wt % $H_2SO_4$ | 2.675 | 0.180 | 8.0 | 2.760 | 0.154 | 7.7 |
| PWA Carbon | 2.81 | 0.168 | 6.8 | pH < 2 |  |  |
|  | 2.796 | 0.169 | 6.6 |  |  |  |

TABLE III

Back Up Times (hours)

| Electrolyte | Discharge Current 1 μA | Discharge Current 0.1 μA |
|---|---|---|
| $Li_2SO_4.H_2O$ | 71 | 525 |
| $Na_2SO_4.10H_2O$ | 90 | 680 |
| $K_2SO_4$ | 68 | 900 |
| $(NH_4)_2SO_4$ | 82 | 575 |
| $H_2SO_4$ | 62 | 380 |
| $NaH_2PO_4$ | 94 | 370 |
| $K_2HPO_4$ | 67 | 385 |
| $(NH_4)H_2PO_4$ | 46 | 50 |
| $Na_2SO_4$/NaBr |  | 750 |
| $H_2SO_4$/HBr |  | 65 |
| $K_2SO_4$/PWA | 107 | 1500 |
| $H_2SO_4$/PWA | 72 | 130 |
| $CaCl_2$ | 70 | 290 |

The graph of FIG. 3 compares the open circuit self discharge curves of several capacitors of the invention incorporating a high pH electrolyte with a present-day commercial double layer capacitor. All capacitors tested start with initial charges of 5 volts. It will be seen that the commercial capacitor containing a highly acidic electrolyte drops to a voltage well below 2 volts in a period substantially less than 50 days (curve 28), while the double layer capacitors of the invention retain charge at a voltage level of about 3 volts or more for periods up to 200 days, thereafter falling gradually to a voltage level of above 2.6 volts after 600 days (curves 26 and 27). The tests on which curve 27 was based were terminated after about 160 days when it became clear that curve 27 would closely parallel curve 26.

Curve 25 of FIG. 3 was obtained by step-charging a capacitor of the invention over a long period of time (several months) prior to test. For example, charging is carried out in incremental steps of 0.25 volts per step, holding at each step for several weeks and proceeding in this fashion until a value of 5 volts is reached. The drop in voltage is minimized by this procedure. This demonstrates that even further improvement of the performance of the capacitors of the invention is attainable by appropriate treatment.

While it is not desired to be bound by any one explanation for the superior results obtained by practicing the present invention, it is believed that the high pH ties up any iron ion that may be present; perhaps by precipitating a stable iron-containing species from iron in solution.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention.

We claim:

1. A double layer capacitor comprising a first and second electrode, said electrodes comprising a high surface area carbon constituent and an electrolyte, and an ionically conductive separator means between and in contact with said electrodes electronically separating said electrodes from each other, said electrolyte having a pH above about 2 whereby the capacitor exhibits low leakage current.

2. The electrolytic capacitor of claim 1 wherein the high surface area carbon of which the electrodes are composed has a surface area of 100–2000 meters$^2$/g.

3. The electrolytic capacitor of claim 2 wherein the electrolyte is composed of an aqueous solution based on one or more salts from the group consisting of sulfates, phosphates and chlorides.

4. The electrolytic capacitor of claim 3 wherein the high surface area carbon of the electrode is an activated carbon.

5. The electrolytic capacitor of claim 4 wherein the high surface area carbon of the electrode is a carbon cloth.

6. The electrolytic capacitor of claim 2 wherein the electrolyte is composed of an aqueous solution comprising a compound selected from the group consisting of $K_2SO_4$, $(NH_4)_2SO_4$, $Li_2SO_4 \cdot H_2O$, $Na_2SO_4$, $K_2HPO_4$, $(NH_4)_2HPO_4$, $Na_2HPO_4$ and $CaCl_2$.

7. The double layer capacitor of claim 3 wherein the electrolyte is a neutral aqueous solution of $K_2SO_4$.

8. A double layer capacitor comprising a positive and a negative electrode, said electrodes comprising a high surface area carbon constituent having a surface area of 100–2,000 meters$^2$/g and an electrolyte which is an aqueous solution having a pH greater than 3.5 comprising about 100 grams of $K_2SO_4$ and less than 1 gram of $KHSO_4$ per liter of solution, and an ionically conductive separator means between and in contact with said electrodes electronically separating said electrodes from each other, said capacitor exhibiting a low leakage current.

* * * * *